United States Patent
Zhang et al.

(10) Patent No.: US 10,011,024 B2
(45) Date of Patent: Jul. 3, 2018

(54) ELASTIC CORRUGATED PIPE SINGLE-ACTING CYLINDER-DRIVEN MECHANICAL GRIPPER WITH SERIES-CONNECTION FLEXIBLE HINGE FRAMEWORK

(71) Applicant: Jiangnan University, Wuxi (CN)

(72) Inventors: Jun Zhang, Wuxi (CN); Chenyang Fan, Wuxi (CN); Jiaping Zhang, Wuxi (CN); Lifeng Lu, Wuxi (CN); Bing Lv, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 15/572,785

(22) PCT Filed: May 11, 2016

(86) PCT No.: PCT/CN2016/081704
§ 371 (c)(1),
(2) Date: Nov. 9, 2017

(87) PCT Pub. No.: WO2016/180338
PCT Pub. Date: Nov. 17, 2016

(65) Prior Publication Data
US 2018/0154527 A1    Jun. 7, 2018

(30) Foreign Application Priority Data
May 12, 2015 (CN) .......................... 2015 1 0240875

(51) Int. Cl.
*B25J 15/02* (2006.01)
*B25J 15/00* (2006.01)
*B25J 15/12* (2006.01)

(52) U.S. Cl.
CPC ......... *B25J 15/022* (2013.01); *B25J 15/0009* (2013.01); *B25J 15/0028* (2013.01); *B25J 15/12* (2013.01); *Y10S 901/32* (2013.01)

(58) Field of Classification Search
CPC .. B25J 15/022; B25J 15/0009; B25J 15/0028; B25J 15/12; B25J 15/024; B25J 11/0045; Y10S 901/32
(Continued)

(56) References Cited

U.S. PATENT DOCUMENTS 5,588,688 A * 12/1996 Jacobsen ................. A61F 2/588
                                                    294/106
9,724,832 B2 * 8/2017 Zhang ...................... B25J 15/12
(Continued)

FOREIGN PATENT DOCUMENTS

CN    101554730 A    10/2009
CN    103174700 A    6/2013
(Continued)

*Primary Examiner* — Gabriela M Puig
(74) *Attorney, Agent, or Firm* — Gokalp Bayramoglu

(57) ABSTRACT

Disclosed is an elastic corrugated pipe single-acting cylinder-driven mechanical gripper with a series-connection flexible hinge framework. The mechanical gripper consists of a palm and two flexible fingers or a palm and three flexible fingers. Each of the flexible fingers is identical in structure, and essentially consists of an elastic corrugated pipe single-acting cylinder (8) and a series-connection flexible hinge (4); configuration of the series-connection flexible hinge (4) is designed according to features of grasping objects; the mechanical gripper generates a grasping force by the elastic corrugated pipe single-acting cylinder (8). The mechanical gripper applies to the grasping of fragile, brittle objects or oddly-shaped objects varying with shapes and dimensions, belonging to the technical field of robots and mechatronics application; when coupled to a robot body, the mechanical gripper is especially suitable for the production and logistic (Continued)

fields for grasping, sorting and packing of foods, agriculture products and light industrial products.

2 Claims, 4 Drawing Sheets

(58) Field of Classification Search
USPC .............................. 294/198, 106; 901/32, 39
See application file for complete search history.

(56) References Cited

U.S. PATENT DOCUMENTS

| | | | | |
|---|---|---|---|---|
| 9,821,472 B2* | 11/2017 | Saadat | ................. | B25J 15/0028 |
| 2012/0025553 A1* | 2/2012 | Fischer | ................. | B25J 15/022 |
| | | | | 294/198 |
| 2017/0157780 A1* | 6/2017 | Zhang | ..................... | B25J 15/12 |
| 2018/0043544 A1* | 2/2018 | Zhang | ................. | B25J 11/0045 |

FOREIGN PATENT DOCUMENTS

| | | | |
|---|---|---|---|
| CN | 103213138 | A | 7/2013 |
| CN | 103429400 | A | 12/2013 |
| CN | 104816303 | A | 8/2015 |
| CN | 204725498 | U | 10/2015 |
| EP | 2420693 | A1 | 2/2012 |
| SU | 812568 | A1 | 3/1981 |
| WO | 0065894 | A1 | 11/2000 |

* cited by examiner

ELASTIC CORRUGATED PIPE SINGLE-ACTING CYLINDER-DRIVEN MECHANICAL GRIPPER WITH SERIES-CONNECTION FLEXIBLE HINGE FRAMEWORK

CROSS REFERENCE TO RELATED APPLICATIONS

This application is the national phase entry of International Application No. PCT/CN2016/081704, filed on May 11, 2016, which is based upon and claims priority to Chinese Application No. 201510240875.3, filed on May 12, 2015, the entire contents of which are incorporated herein by reference.

TECHNICAL FIELD OF THE INVENTION

The present invention relates to an elastic corrugated pipe single-acting cylinder-driven mechanical gripper with a series-connection flexible hinge framework. The mechanical gripper consists of a palm and two flexible fingers or a palm and three flexible fingers. Each of the flexible fingers is identical in structure, and essentially consists of an elastic corrugated pipe single-acting cylinder and a series-connection flexible hinge; configuration of the series-connection flexible hinge is designed according to features of the object to be grasped; the mechanical gripper generates a grasping force by the elastic corrugated pipe single-acting cylinder. The mechanical gripper applies to the grasping of fragile, brittle objects or oddly-shaped objects varying with shapes and dimensions, belonging to the technical field of robots and mechatronics application; when coupled to a robot body, the mechanical gripper is especially suitable for the production and logistic fields for grasping, sorting and packing of foods, agriculture products and light industrial products.

BACKGROUND

In view of the current mass production situations of the light industry and food industry, a logistical grasping mechanical gripper is needed to meet the logistics and packing demands of irregularly-shaped and diversified raw materials, semi-finished products and finished products and to solve the problems of high cost and poor operation conditions of single labor manual operation. Various complicated objects to be grasped are classified into the following types: (1) flexible objects tending to change in shape (bread, objects in flexible packaging); (2) fragile, brittle objects (bird eggs, glass and ceramic products); (3) irregularly-shaped objects greatly varying in dimensions (fruits and vegetables); (4) oddly-shaped objects which are in chaos at different positions and difficult to sort (wine bottles, cosmetic bottles). It can be seen from the above that complicated objects greatly vary with material property, shape, dimensions and position status. Conventional industrial mechanical grippers are gripper-type or parallel shift type in structure, and only can grasp rigid workpieces which are identical in shape and dimensions, with the same position status, and not easily broken. A humanoid dexterous hand needs to sense the space position and shape of a complicated object and needs precise control over the movement and the grasping force, otherwise, the complicated object will be damaged or cannot be reliably grasped. However, current humanoid dexterous hands are still under lab research, have high costs and impose high requirements for service environment.

SUMMARY

Technical Problems

The elastic corrugated pipe single-acting cylinder-driven mechanical gripper with a series-connection flexible hinge framework according to the present invention has the following features: the mechanical gripper has a high degree of flexible freedom and buffering effect on external loads, and therefore has high flexibility self-adaption when grasping complicated objects; meanwhile, the elastic corrugated pipe single-acting cylinder operates smoothly and responds quickly because of not being stressed by the friction forces generated by a cylinder piston and a rubber seal on a piston rod.

The key components of the mechanical gripper according to the present invention are flexible fingers, which are also called flexible joints. Prior to the present invention, a patent (articulated flexible manipulator, 200810023616.5) discloses a rubber corrugated pipe expandable loading-type pneumatic artificial muscle driver-driven flexible bending joint with a flexible hinge frame, with the following defects: (1) without structural amplification of the radial force, along with the increase in the angular displacement of the flexible hinge when the flexible hinge is driven by the artificial muscle, the bigger the pressure increment in the inner cavity of the artificial muscle required by the increment of the angular displacement in a unit is, the more difficult it is for the flexible hinge to bend, which means the smaller the slopes of the two angular displacement-air pressure curves of the series-connection flexible hinge of the flexible finger are; (2) the position of the flexible hinge framework where the driving force is applied cannot be adjusted, so the versatility of grasping objects is not sufficiently good. A patent application (pneumatic serial-connection flexible hinge multi-finger paw of compliant mechanism, 201310123063.1) discloses a mechanical gripper driven by a cylinder, with the following defects: (1) due to two sliding friction forces generated by rubber seals on a cylinder piston and a piston rod, the dynamic and static friction coefficients of the mechanical gripper greatly vary with each other, and the sliding friction force is involved with the stress on the piston rod and changes dramatically, so the synchronism control over the cylinder piston movement of the three fingers is complicated, and the position servo control is difficult; (2) the flexible fingers of the mechanical grippers are vertically installed, apply to the pinching mode of "fingertips touch" only, and cannot employ the enveloped grasping mode of "touch of finger segments and palm at several positions", so the application scope is small.

Technical Solution

The present invention overcomes the above defects. The mechanical gripper of the present invention has two or three flexible fingers, and each of the flexible fingers is identical in structure. In principle, the flexible fingers are four-hinge five-rod structures, wherein the five rods include a drive rod (the elastic corrugated pipe single-acting cylinder 8), three flexible hinge rods formed by series-connection flexible hinges 4 (a combination of the flexible hinge rods and a bendable plate 3 on the series-connection flexible hinges 4, a combination of a middle flexible hinge rod, a lower flexible hinge rod and a hinge base 6), and two-force rod 7; and the four hinges include two flexible hinges of the series-connection flexible hinges 4, and two hinges at the two ends of the two-force rod 7.

The solution of the present invention is as follows:

As shown in FIG. 1 and FIG. 2, one structure of a mechanical gripper according to the present invention consists of two identical flexible fingers and a palm plate 1. The two identical flexible fingers are left-right symmetrically installed in guide grooves of the palm plate, with a center distance defined by a center hole on the palm plate. The flexible fingers consists of a finger root 2, a bendable plate 3, a series-connection flexible hinge 4, a pressure plate 5, a hinge base 6, a two-force rod 7, and an elastic corrugated pipe single-acting cylinder 8. The mechanical gripper according to the present invention has the following features: the finger root 2 is configured to perform guidance in the guide groove of the palm plate 1, a screw passes through a waist-shaped groove on the finger root 2 to fix the finger root 2 on the palm plate 1, the waist-shaped groove on the finger root 2 is used to regulate the center distance of the flexible finger, through the screw, an upper flexible hinge rod of the series-connection flexible hinge 4 is clamped between the bendable plate 3 and the finger root 2, the series-connection flexible hinge 4 is straight in an initial state; the pressure plate 5 has four threaded holes which are inserted by four screws; four screws penetrate the hinge base 6 to tighten a lower flexible hinge rod of the series-connection flexible hinge 4 on the pressure plate 5, the lower flexible hinge rod of the series-connection flexible hinge 4 has no hole, so that an installation position of the hinge base 6 on the lower flexible hinge rod of the series-connection flexible hinge 4 is convenient to be adjusted, the lower flexible hinge rod of the series-connection flexible hinge 4 is curved at a bottom end; both ends of the two-force rod 7 are hinges, being connected by hinges with the hinge base 6 and a hinge support 11a on the elastic corrugated pipe single-acting cylinder 8, respectively.

As shown in FIG. 3, another structure of a mechanical gripper according to the present invention consists of three identical flexible fingers and a palm plate 1. The three identical flexible fingers are uniformly installed in guide grooves of the palm plate 1 at an interval of 120°, with center distances defined by a center hole on the palm plate 1. The structure of the flexible finger is perfectly identical to the above mentioned structure, and consists of the finger root 2, the bendable plate 3, the series-connection flexible hinge 4, the pressure plate 5, the hinge base 6, the two-force rod 7, and the elastic corrugated pipe single-acting cylinder 8.

As shown in FIG. 4 and FIG. 5, the elastic corrugated pipe single-acting cylinder 8 consists of a bottom cover 1a, a rubber pad 2a, a cylinder base 3a, a hoop 4a, an elastic corrugated pipe 5a, a guide sleeve 6a, a linear bearing 7a, a threaded cover 8a, a guide rod 9a, a guide rod base 10a, a hinge support 11a, a compression spring 12a, a nylon regulating plate 13a, a spring cover 14a, an internal hexagonal screw 15a, a sealing ring 16a, and a union elbow 17a. Features thereof are: the bottom cover 1a, the rubber pad 2a and the cylinder base 3a are fixed together through screws, a flange at an upper end of the guide sleeve 6a is pressed by the cylinder base 3a on the rubber pad 2a, a column below the flange of the guide sleeve 6a is in clearance fit with a minimum hole of the cylinder base 3a, ensuring coaxiality of the guide sleeve 6a and the cylinder base 3a; the elastic corrugated pipe 5a is fixed on the cylinder base 3a and the guide rod base 10a through the hoop 4a; the linear bearing 7a guiding the guide rod 9a is installed in the guide sleeve 6a; the threaded cover 8a caps the guide sleeve 6a in a screw manner to axially fix the linear bearing 7a; the guide rod 9a is installed on the guide rod base 10a, the compression spring 12a is disposed inside the guide sleeve 6a, the nylon regulating plate 13a and the spring cover 14a are fixed on the guide rod 9a by the internal hexagonal screw 15a, the compression spring 12a is pressed by the spring cover 14a; nylon regulating plates 13a with different thicknesses are replaced, to regulate a pre-tightening force of the compression spring 12a and a stroke of the elastic corrugated pipe single-acting cylinder 8; the hinge support 11a is installed at a symmetric center of the guide rod base 10a, a phase angle of the elastic corrugated pipe 5a on the guide rod base 10a is adjusted, ensuring the hinge support 11a is on the same plane together with the hinge base 6 and the two-force rod 7; the union elbow 17a is installed on the cylinder base 3a in a threaded way, and the sealing ring 16a is provided between a thread of the union elbow 17a and the cylinder base 3a.

As shown in FIG. 6 and FIG. 7, the palm plate 1 is provided with four guide grooves, the left guide groove is left-right symmetrical to the right-middle guide groove, the left guide groove and the right-upper guide groove and the right-lower guide groove are uniformly distributed at an interval of 120°, the four guide grooves have four threaded holes and the four threaded holes are identical in center distance.

Beneficial Effect

Compared with the prior art, the present invention has the following advantages:

(1) The elastic corrugated pipe single-acting cylinder 8 is not stressed by the sliding friction force generated by the rubber seal, so the synchronism control of the piston movement of the three fingers is relatively simple, and the position servo control is not difficult.

(2) The elastic corrugated pipe single-acting cylinder 8 is not stressed by the sliding friction force generated by the rubber seal and adopts the guide mode of the rolling friction of the linear bearing, so the energy consumption is small, the response is quick, and the low-speed creeping phenomenon does not exist.

(3) The flexible fingers of the mechanical gripper are installed in an inclined way, not only applying the pinching mode of "fingertip touch", but also employing the enveloped gripping mode of "touch with fingers and palm at several positions", so the application scope is relatively wide.

(4) The rubber corrugated pipe of the elastic corrugated pipe single-acting cylinder 8 is uniformly stressed, so the service life is long.

(5) The rubber corrugated pipe and the hoop of the elastic corrugated pipe single-acting cylinder 8 are still sleeved on the guide sleeve 6a and the guide rod 9a even in the separated state, so the structure is safe and reliable.

DETAILED DESCRIPTION OF THE INVENTION

Embodiments

Figure 1:
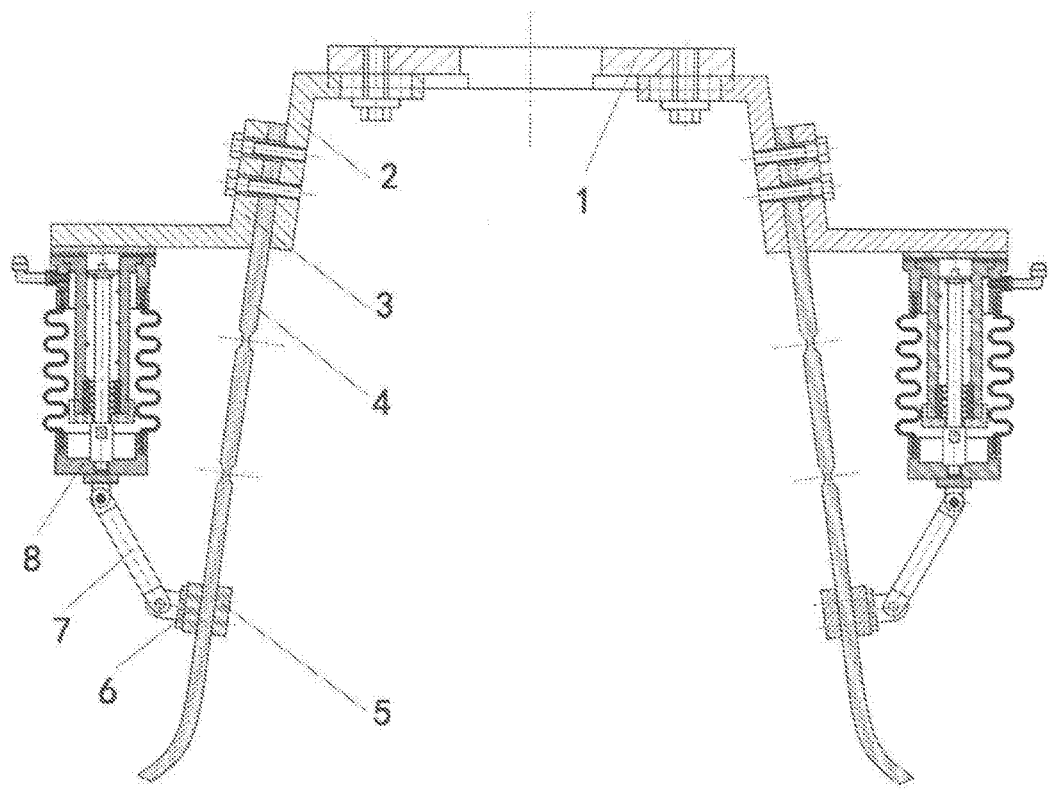
FIG. 1 is a front view of an elastic corrugated pipe single-acting cylinder-driven mechanical gripper with a series-connection flexible hinge framework.
Figure 2:
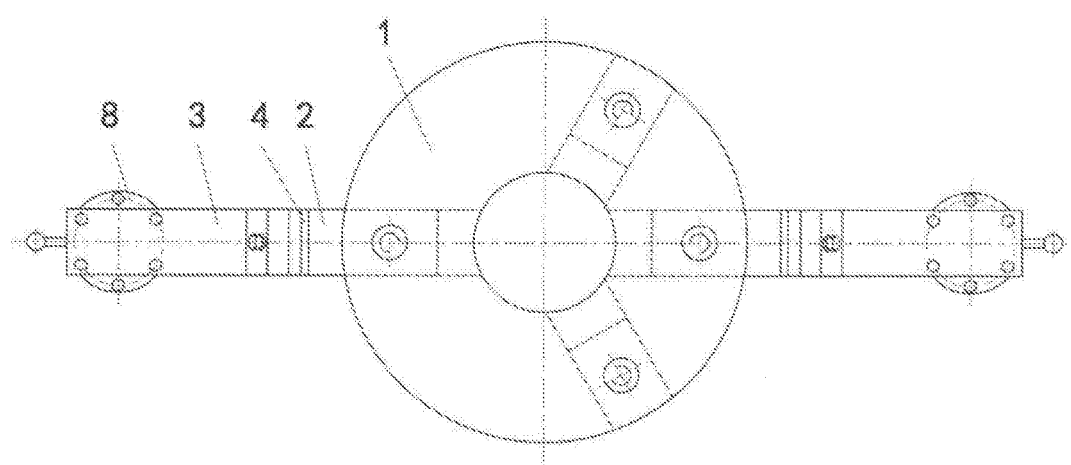
FIG. 2 is a top view of two fingers of the elastic corrugated pipe single-acting cylinder-driven mechanical gripper with a series-connection flexible hinge framework in the installation status.
Figure 4:
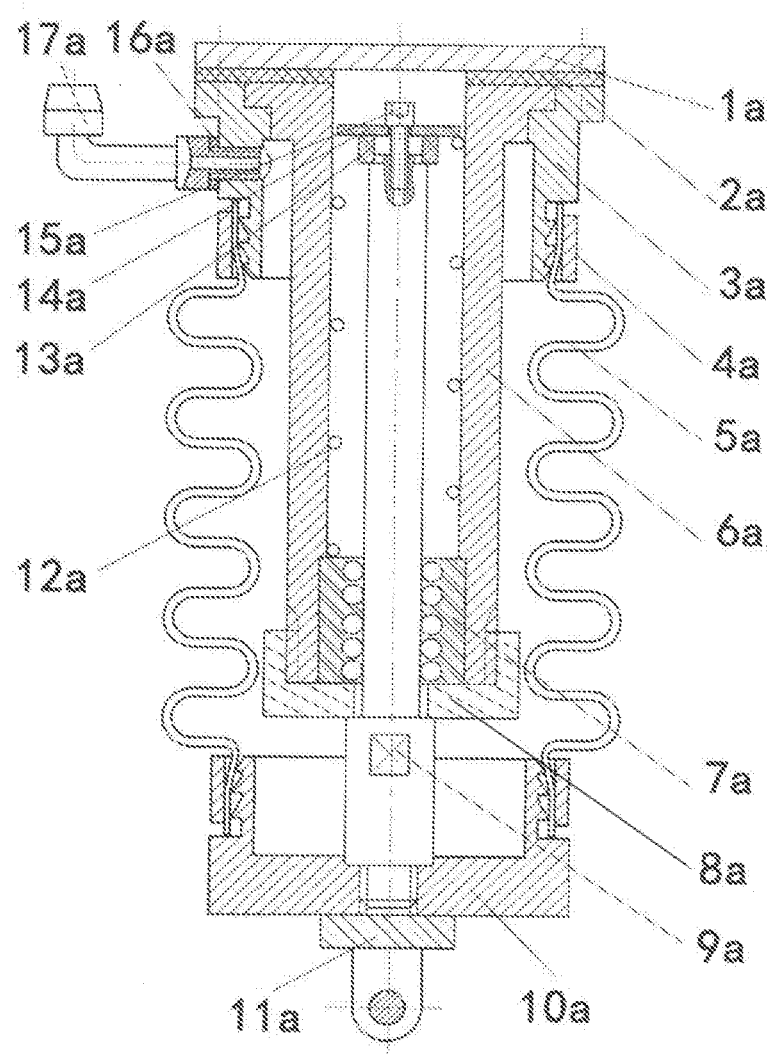
FIG. 4 is a front view of an elastic corrugated pipe single-acting cylinder of the elastic corrugated pipe single-acting cylinder-driven mechanical gripper with a series-connection flexible hinge framework.
Figure 5:
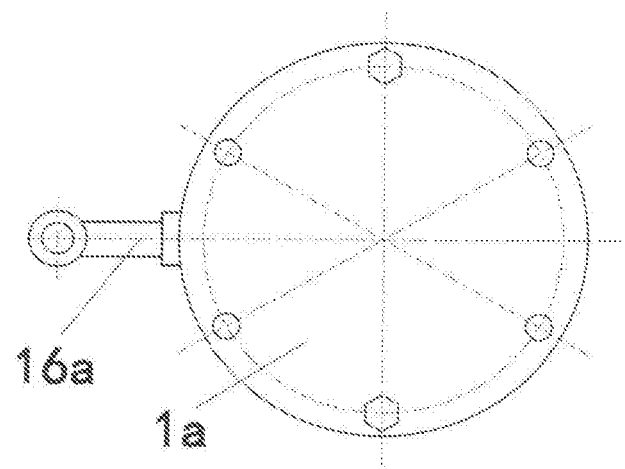
FIG. 5 is a top view of the elastic corrugated pipe single-acting cylinder of the elastic corrugated pipe single-acting cylinder-driven mechanical gripper with a series-connection flexible hinge framework.
Figure 6:
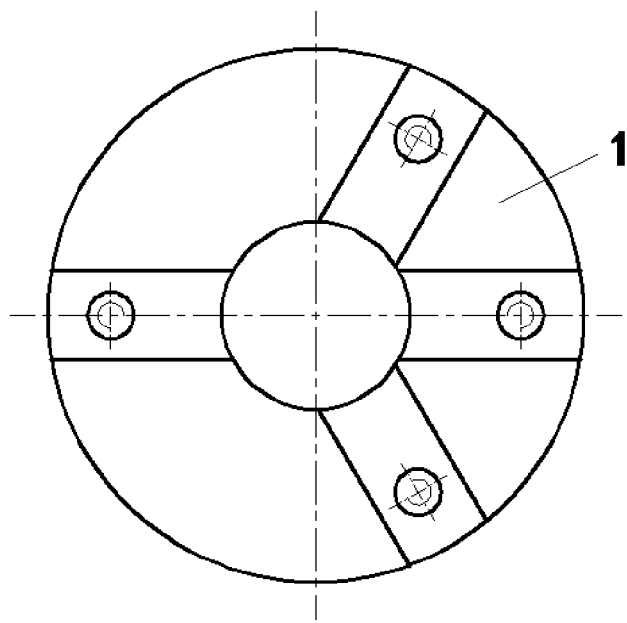
FIG. 6 is a bottom view of a palm plate of the elastic corrugated pipe single-acting cylinder-driven mechanical gripper with a series-connection flexible hinge framework.
Figure 7:
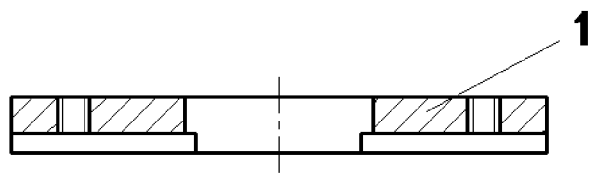
FIG. 7 is a front view of the palm plate of the elastic corrugated pipe single-acting cylinder-driven mechanical gripper with a series-connection flexible hinge framework.

The working principle and working process of the present invention will be explained below:

As shown in FIGS. 1-2 and FIGS. 4-5, the working principle of the present invention is as follows: for long and cuboid complicated objects, after theoretical analysis and experimental study, determination of the safety scope of the grasping force, and optimal design of the structural dimensions of the mechanical gripper, the characteristic parameters and pre-tightening force of the compression spring 12a, configuration design of two hinges in the series-connection flexible hinges are carried out according to the variable scopes of shape and dimensions of objects to be grasped and material property of objects to be grasped, thus determining dimensions of the installation position of the flexible fingers on the palm plate 1, and dimensions of the installation position of the hinge base 6 on the lower flexible hinge rod of the series-connection flexible hinge 4.

Meanwhile, the structural dimensions of the mechanical gripper with the series-connection flexible hinge framework, the elastic parameters of the compression spring 12a and configuration of two hinges in the series-connection flexible hinges are comprehensively designed upon specific grasping objects, it is necessary to ensure that the resultant force and resultant moment generated by each elastic returning force on the guide rod 9a during return do not generate self-locking (in order to prevent self-locking, the linear bearing 7a is adopted to increase the pressure angle). Therefore, the guide rod 9a of the elastic corrugated pipe single-acting cylinder 8 returns to the original position, and the series-connection flexible hinge 4 of the mechanical gripper returns to the initial straight status.

Moreover, the elastic corrugated pipe is initially "U" shaped, and when it is assembled to serve as a part of the elastic corrugated pipe single-acting cylinder 8, the elastic corrugated pipe is initially "Ω" shaped, thus obtaining a relatively larger stroke.

As shown in FIGS. 1-2 and FIGS. 4-5, the working process of the present invention is as follows: (1) When the gas pressure in the elastic corrugated pipe single-acting cylinder 8 is the set pressure, the elastic corrugated pipe single-acting cylinder 8 overcomes the elastic forces of the compression spring 12a and reaches the scope of the required grasping contact force, and keeps the grasping status; in the grasping status, a degree of flexible freedom is generated due to the synergistic effect of the elastic forces of the two flexible hinges in the series-connection flexible hinges 4, so the mechanical gripper has self-adaption to the grasped objects; (2) when the gas pressure in the elastic corrugated pipe single-acting cylinder 8 is released, the mechanical gripper with the series-connection flexible hinge framework returns to the initial status by the combined effect of the series-connection flexible hinge 4, and the compression spring 12a in the elastic corrugated pipe single-acting cylinder 8.

Figure 3:
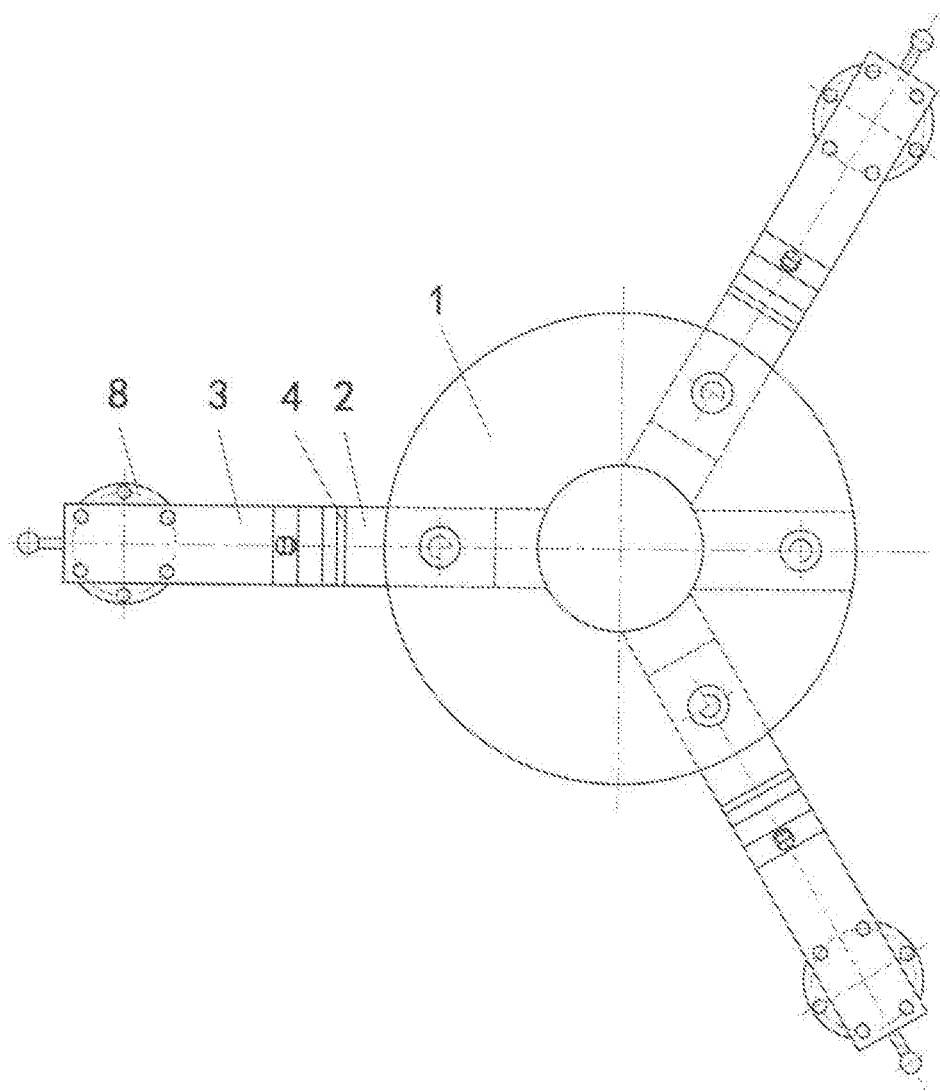
FIG. 3 is a top view of three fingers of the elastic corrugated pipe single-acting cylinder-driven mechanical gripper with a series-connection flexible hinge framework in the installation status.

As shown in FIG. 1, FIG. 3 and FIGS. 4-5, for spherical and short cylindrical complicated objects, design and regulation are also carried out by the above steps after experimental study and theoretical analysis.

What is claimed is:

1. An elastic corrugated pipe single-acting cylinder-driven mechanical gripper with a series-connection flexible hinge framework, comprising:
   a structure of a mechanical gripper, including two identical flexible fingers and a palm plate, the two identical flexible fingers being left-right symmetrically installed in guide grooves of the palm plate, with a center distance defined by a center hole on the palm plate;
   wherein, each of the two flexible fingers consists of a finger root, a bendable plate, a series-connection flexible hinge, a pressure plate, a hinge base, a two-force rod, and an elastic corrugated pipe single-acting cylinder;
   wherein, the finger root is configured to perform guidance in a guide groove of the palm plate, a first screw passes through a capsule-shaped groove on the finger root to fix the finger root on the palm plate, the capsule-shaped groove on the finger root is used to regulate a center distance of the flexible finger, through the first screw, an upper flexible hinge rod of the series-connection flexible hinge is clamped between the bendable plate and the finger root, the series-connection flexible hinge is straight in an initial state; the pressure plate has four threaded holes which are inserted by four second screws; the four second screws penetrate the hinge base to tighten a lower flexible hinge rod of the series-connection flexible hinge on the pressure plate, the lower flexible hinge rod of the series-connection flexible hinge has no hole, so that an installation position of the hinge base on the lower flexible hinge rod of the series-connection flexible hinge is convenient to be adjusted, the lower flexible hinge rod of the series-connection flexible hinge is curved at a bottom end; both ends of the two-force rod are hinges, being connected by hinges with the hinge base and a hinge support on the elastic corrugated pipe single-acting cylinder, respectively;
   wherein, the elastic corrugated pipe single-acting cylinder consists of a bottom cover, a rubber pad, a cylinder base, a hoop, an elastic corrugated pipe, a guide sleeve, a linear bearing, a threaded cover, a guide rod, a guide rod base, the hinge support, a compression spring, a nylon regulating plate, a spring cover, an internal hexagonal screw, a sealing ring, and a union elbow;
   wherein, the bottom cover, the rubber pad and the cylinder base are fixed together through third screws, a flange at an upper end of the guide sleeve is pressed by the cylinder base on the rubber pad, a column below the flange of the guide sleeve is in clearance fit with a minimum hole of the cylinder base, ensuring coaxiality of the guide sleeve and the cylinder base; the elastic corrugated pipe is fixed on the cylinder base and the guide rod base through the hoop; the linear bearing guiding the guide rod is installed in the guide sleeve; the threaded cover caps the guide sleeve in a screw manner to axially fix the linear bearing; the guide rod is installed on the guide rod base, the compression spring is disposed inside the guide sleeve, the nylon regulating plate and the spring cover are fixed on the guide rod by the internal hexagonal screw, the compression spring is pressed by the spring cover; the nylon regulating plate is replaced by other nylon regulating plates with different thicknesses, to regulate a pre-tightening force of the compression spring and a stroke of the elastic corrugated pipe single-acting cylinder; the hinge support is installed at a symmetric center of the guide rod base, a phase angle of the elastic corrugated pipe on the guide rod base is adjusted, ensuring the hinge support is on the same plane together with the hinge base and the two-force rod; the union elbow is installed on the cylinder base in a threaded way, and the sealing ring is provided between a thread of the union elbow and the cylinder base.

2. An elastic corrugated pipe single-acting cylinder-driven mechanical gripper with a series-connection flexible hinge framework, comprising:
 a structure of a mechanical gripper, including three identical flexible fingers palm plate, the three identical flexible fingers being uniformly installed in guide grooves of the palm plate at an interval of 120°, with center distances defined by a center hole on the palm plate;
 wherein, each of the three flexible fingers consists of a finger root, a bendable plate, a series-connection flexible hinge, a pressure plate, a hinge base, a two-force rod, and an elastic corrugated pipe single-acting cylinder;
 wherein, the finger root is configured to perform guidance in a guide groove of the palm plate, a first screw passes through a capsule-shaped groove on the finger root to fix the finger root on the palm plate, the capsule-shaped groove on the finger root is used to regulate a center distance of the flexible finger, through the first screw, an upper flexible hinge rod of the series-connection flexible hinge is clamped between the bendable plate and the finger root, the series-connection flexible hinge is straight in an initial state; the pressure plate has four threaded holes which are inserted by four second screws; the four second screws penetrate the hinge base to tighten a lower flexible hinge rod of the series-connection flexible hinge on the pressure plate, the lower flexible hinge rod of the series-connection flexible hinge has no hole, so that an installation position of the hinge base on the lower flexible hinge rod of the series-connection flexible hinge is convenient to be adjusted, the lower flexible hinge rod of the series-connection flexible hinge is curved at a bottom end; both ends of the two-force rod are hinges, being connected by hinges with the hinge base and a hinge support on the elastic corrugated pipe single-acting cylinder, respectively;
 wherein, the elastic corrugated pipe single-acting cylinder consists of a bottom cover, a rubber pad, a cylinder base, a hoop, an elastic corrugated pipe, a guide sleeve, a linear bearing, a threaded cover, a guide rod, a guide rod base, the hinge support, a compression spring, a nylon regulating plate, a spring cover, an internal hexagonal screw, a sealing ring, and a union elbow;
 wherein, the bottom cover, the rubber pad and the cylinder base are fixed together through third screws, a flange at an upper end of the guide sleeve is pressed by the cylinder base on the rubber pad, a column below the flange of the guide sleeve is in clearance fit with a minimum hole of the cylinder base, ensuring coaxiality of the guide sleeve and the cylinder base; the elastic corrugated pipe is fixed on the cylinder base and the guide rod base through the hoop; the linear bearing guiding the guide rod-is installed in the guide sleeve; the threaded cover caps the guide sleeve in a screw manner to axially fix the linear bearing; the guide rod is installed on the guide rod base, the compression spring is disposed inside the guide sleeve, the nylon regulating plate and the spring cover are fixed on the guide rod by the internal hexagonal screw, the compression spring is pressed by the spring cover; the nylon regulating plate is replaced by other nylon regulating plates with different thicknesses, to regulate a pre-tightening force of the compression spring and a stroke of the elastic corrugated pipe single-acting cylinder; the hinge support is installed at a symmetric center of the guide rod base, a phase angle of the elastic corrugated pipe on the guide rod base is adjusted, ensuring the hinge support is on the same plane together with the hinge base and the two-force rod; the union elbow is installed on the cylinder base in a threaded way, and the sealing ring is provided between a thread of the union elbow and the cylinder base.

\* \* \* \* \*